United States Patent [19]
Johnson

[11] Patent Number: 4,658,846
[45] Date of Patent: Apr. 21, 1987

[54] DISASTER MITIGATION GAS SHUT-OFF DEVICE

[76] Inventor: Roger L. Johnson, 575 Wisteria St., Chula Vista, Calif. 92011

[21] Appl. No.: 903,508

[22] Filed: Sep. 4, 1986

[51] Int. Cl.[4] .............................................. F16K 17/36
[52] U.S. Cl. ........................................ 137/39; 137/460
[58] Field of Search ...................... 137/38, 39, 45, 460

[56] References Cited

U.S. PATENT DOCUMENTS 4,028,510  6/1977  Yamaura ........................... 137/38 X
4,513,763  4/1985  Ware ..................................... 137/38

Primary Examiner—Robert G. Nilson

[57] ABSTRACT

A gas valve for attachment to a gas line for preventing flow of gas during and subsequent to a vibratory shock above a pre-determined intensity; a tilting of said valve beyond a pre-determined angle from the vertical; and/or when an excess flow of gas through said valve above a pre-determined velocity occures. The trip mechanism is a set of three hinged, centrally suspended inertia weights which are mass biased away from said suspension points and incorporate aerodynamically designed flow vanes and having release hooks at their lower inner facing ends which engage an articulated head atop a shaft and stopper assembly which is spring biased downward against a valve seat near the inlet orifice of said valve. The valve having an external reset lever and multiple inertia weight/flow vane configurations for custom applications.

6 Claims, 6 Drawing Figures

DISASTER MITIGATION GAS SHUT-OFF DEVICE

REFERENCES CITED

U.S. Patent Nos.

4,373,548; 2/1983; Chou; 137/460
4,331,171; 5/1982; Novi; 137/45
4,336,818; 6/1982; Dauvergne; 137/38
4,278,102; 7/1981; Kelley/Crane/Ray; 137/39
4,043,350; 8/1977; Ichimi/Funabashi; 137/39

BACKGROUND OF THE INVENTION

1. Field of the Invention:

The present invention pertains generally to the mitigation of the destructive effects of a major earthquake in a populated area, and specifically to the following applications:

a. to stop the flow of gas to an occupancy where major earthquakes or other shocks above a pre-determined intensity may cause a gas line to rupture, resulting in a life/property threatening fire, and b. to stop the flow of gas to an occupancy in the case of a sheared gas line within said occupancy from other than a vibratory shock, and c. to stop the flow of gas from a hazardous material storage container in the event of a vibratory shock above a predetermined intensity, or when an excess flow of gas passes through said valve, or when said container is tilted beyond a pre-determined angle from the vertical.

2. Description of the Prior Art:

Heretofore, devices which shut off the flow of gas to an occupancy have generally been sensitive to only one, and in some instances, two of the effects of a major earthquake; tilting beyond a pre-determined angle from the vertical, lateral shocks above a pre-determined intensity, and from an excess velocity of gas through said shut-off valve housing. Recent valves which represent these forms of gas shut-off devices are U.S. Pats. Nos. 4,373,548; 4,331,171; 4,336,818; 4,278,102 and 4,261,379. One exception to the shock or excess flow means of actuation is a recent Japanese shut-off valve (U.S. Pat. No. 4,043,350) which employs a pulled pin means to actuate a spring-biased closure mechanism.

The present invention is a marked improvement over the previous art, in that it not only reacts to the vibratory shock of a major earthquake, but also to a tilting moment and to an excess flow of gas caused by a sheared line within the gas distribution system. One excess flow device exists (U.S. Pat. No. 4,373,548), but does not react to the shock of a major earthquake.

Another important improvement over the prior art (U.S. Pat. No. 4,331,171; 4,336,818; 4,278,102 and 4,261,379) is that the present invention can be reset after actuation without partial disassembly, as is necessary with the inventions cited.

A final important feature of the present invention is that because of the valve's simplicity of design and limited number of moving parts, said invention can be manufactured and sold below the cost of the previous art, making it affordable to the general public.

SUMMARY OF THE INVENTION

The gas valve of this invention is a safety shut-off valve which responds; to physical disturbances above a pre-determined frequency and amplitude, to tilting moments greater than a pre-determined angle, and to excessive flow velocities above a pre-determined value to automatically activate the closure of a gas line in which it is installed.

Earth scientists unanimously agree on the inevitability of major earthquakes—that is, earthquakes with a Richter magnitude in excess of 7.0—within the next three decades, with casualty estimates for any single-fault event ranging between 4,000 to 23,000 persons dead and 18,000 to 91,000 hospitalized, depending upon the time of day and magnitude of the event. For each person requiring hospitalization, several others with varying degrees of injuries will remain trapped within collapsed structures. A major concern of disaster planners is the numerous local fires which must be expected as the result of broken gas lines within occupied buildings where these victims may remain for up to two weeks while awaiting rescue and treatment.

While the design of the present invention is directed particularly at major earthquakes, the valve is useful in any environment wherein it is desirable to halt the flow of a hazardous gaseous material during and subsequent to any violent shock which could cause broken gas lines in populated areas. Important applications for said valve exist at hospitals where explosive gases are employed as anesthetics, at water treatment plants and public swimming pools which employ large quantities of concentrated chlorine, and welding shops where acetylene tanks pose a fire hazard. Similarly, other natural disasters such as floods and tornados can cause displacement of structures and the shearing of gas lines, as can a vehicle striking a structure, nessitating installation of the present invention.

The gas valve is constructed with a metal tubular housing having a threaded inlet orifice at the bottom and a similar threaded outlet orifice at the top, both of which are compatible with standard pipe threads. Spaced at pre-determined intervals within said housing are four circular discs which serve to suspend and allign the moving parts of said valve. Said upper three circular discs having vertical holes in their bodies to allow for the free flow of gas through the valve.

A release mechanism consisting of three wedge-shaped inertia weights which are spaced radially 120 degrees from each other and are attached near their lower ends by hinge pins to a longitudinally centered suspension rod; said suspension rod being attached to the uppermost circular disc. Said inertia weights hold a shaft and stopper in the open flow, or operating position by hooks on their bottom inner edges; these said hooks gripping a conical-shaped articulated head which is attached to the top end of said shaft and stopper by a ball and socket arrangement. When any one of the said three inertia weights is displaced inward, toward the suspension rod, its hook will disengage from a lip on said articulated head, allowing said head to tilt laterally, thereby releasing itself from the other two hooks, allowing said shaft and stopper to drop by spring bias means to engage the valve seat (a circular disc) near the inlet orifice of said valve. Two other circular discs are situated near the mid-point of said valve; the upper said disc serving to allign said shaft and stopper while the lower serves as the stationary base for the spring to push against and also to allign said shaft and stopper longitudinally within the valve housing. Located between these two circular discs is a reset lever which extends through the valve housing, through a gas tight ball and socket, its terminus end extending into a slot in said shaft.

Attached to, and being an integral part of each of the three said inertia weights, is an aerodynamically designed flow vane which lifts said weight upward and inward to release the shaft and stopper when a pre-determined flow velocity through said valve is exceeded. By varying the shape and size of said flow vanes and by changing the weight distribution of said inertia weights during construction, an unlimited variation of valve actuation threasholds can be acheived, thereby allowing customization of the device to any application.

These and other features will become apparent upon consideration of the detailed description of the preferred embodiments.

DETAILED DESCRIPTION OF THE PREFERRED EMBODIMENT

Figure 1:
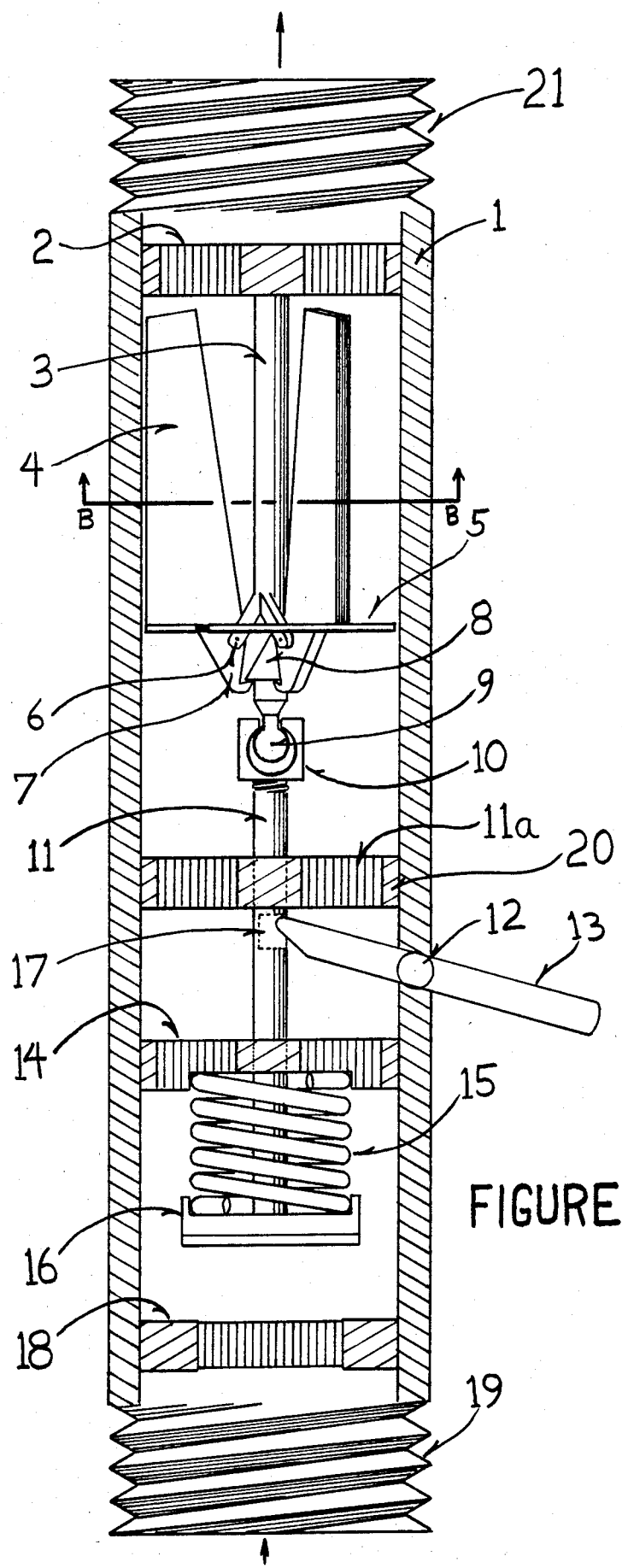
FIG. 1 is a cross sectional elevation view on the line AA of FIG. 3, showing the complete valve assembly.
Figure 2:
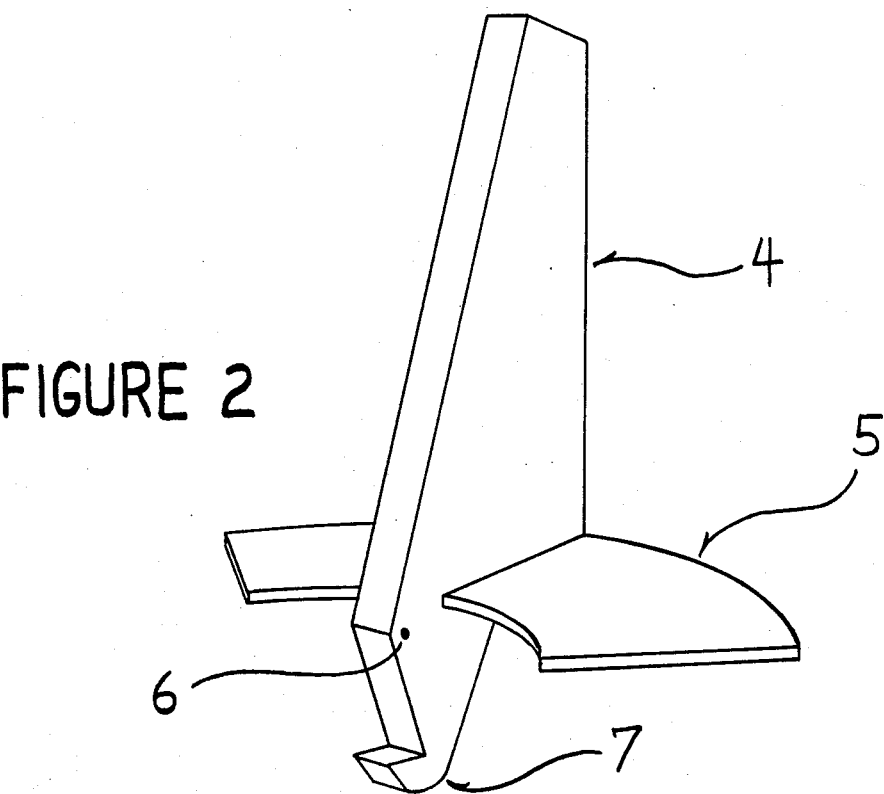
FIG. 2 is a perspective view of one of the three inertia weights showing the preferred flow vane configuration.
Figure 3:
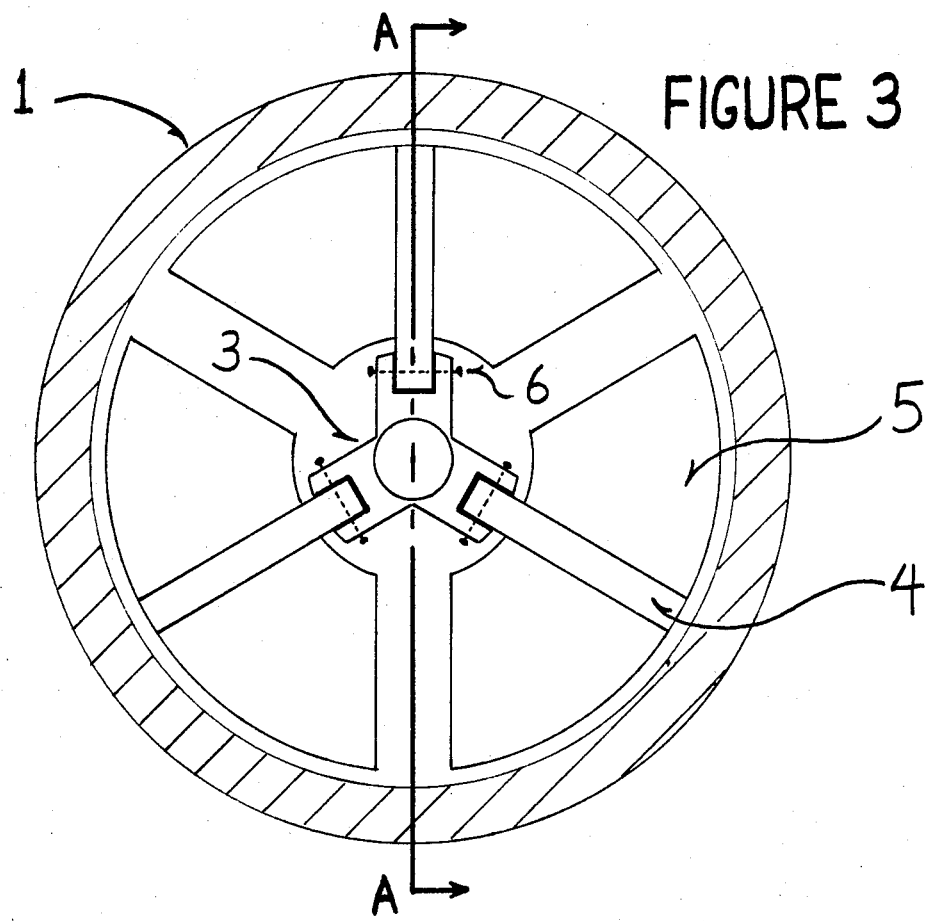
FIG. 3 is a top sectional view on the line BB of FIG. 1 showing the three inertia weights and how they are connected to the suspension rod.

Refering to FIG. 1, the gas valve is constructed within a symetrical length of metal pipe hereafter refered to as the housing 1. Said housing 1 is machined with a threaded inlet connection orifice 19 at its base and an opposed threaded outlet connection orifice 21 at its top, forming a continuous gas conduit. The housing 1 is designed for installation in a vertical run of gas conduit with the gas flow from bottom to top.

Figure 4A:
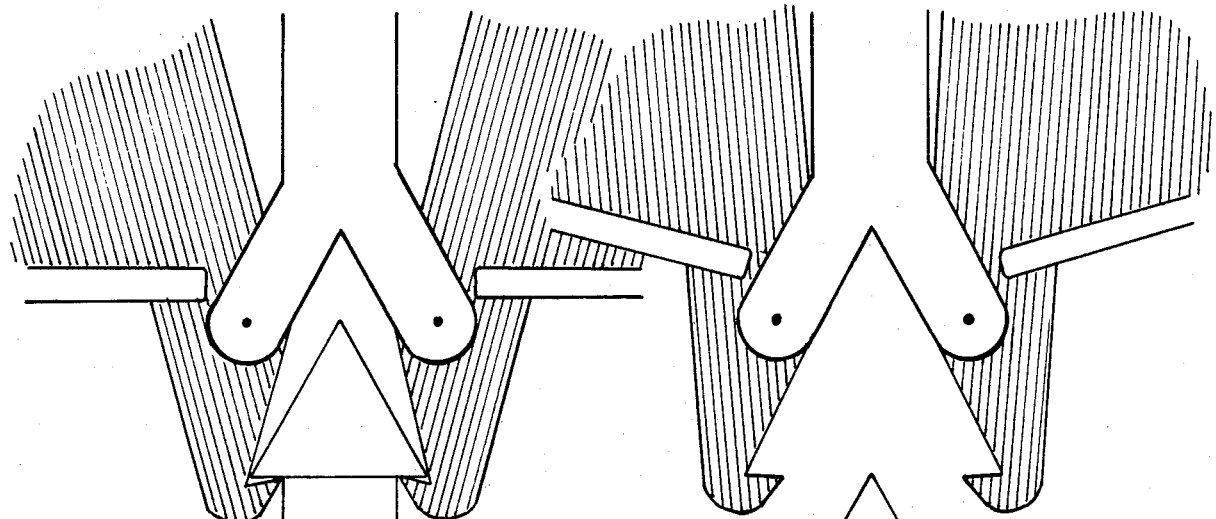
FIG. 4A is a side view of the inertia weight hooks as they are engaged under the lip of the conically shaped articulated head.
Figure 4B:
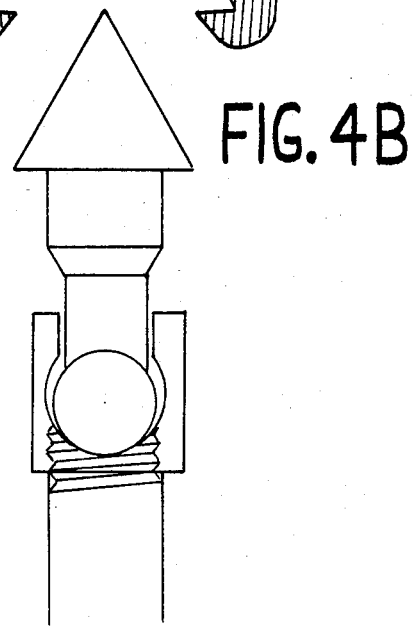
FIG. 4B is a side view of the inertia weight hooks spread apart so as to disengage the articulated head, with said head dropped away from said hooks.

Once again refering to FIG. 1, a vertically oriented suspension rod 3 with three hinge points 6 at its lower end is located centrally along the longitudinal axis of said housing 1 and connected at its upper end to a horizontally oriented circular disc 2 within said housing 1 near its outlet orifice 21. Attached to said suspension rod 3 at said hinge points 6 are three wedge-shaped inertia weights 4 which have thin horizontal projections to either side of said weights 4 in the form of aerodynamically designed flow vanes 5. At the lower end of said inertia weights 4, below said hinge points 6 are three inward facing hooks 7, one on each inertia weight 4, which are biased inward, toward one another as the result of the upper portions of said inertia weights 4 being biased outward by gravity working on their top-heavy masses. Now refering to FIGS. 4A and 4B, these three said hooks 7 engage a conically shaped articulated head 8 which is attached to a longitudinal shaft 11 by means of a ball 9 and socket 10 arrangement, which allows for a limited amount of lateral movement of said articulated head. Shaft 11 is attached at its lower end to a stopper 16. Said shaft 11 penetrates a second circular disc 20 with the sole purpose of alligning the upper end of said shaft 11 along the longitudinal axis of said housing 1. Located a short distance below disc 20 is a third circular disc 14 with the dual purpose of alligning said shaft 11 (as does disc 20) and providing a stable body against which the upper end of spring 15 rests. Each of these three said circular discs (2,20 and 14) have drilled vent holes 11a means for gas to flow upward through them. The lower end of spring 15 rests in the upper side of stopper 16, providing the means for pushing said stopper 16 downward to engage valve seat 18, a fourth circular disc, near the inlet orifice of said housing 1. Located between said circular disc 20 and said circular disc 14 is located a valve reset lever 13 which penetrates said housing 1 at a near-perpendicular angle to the longitudinal axis of said housing 1 and inserts into slot 17 in said shaft 11. At the penetration point in said housing 1 is a gas-proof hinge 12 which allows said reset lever 13 to pivot vertically on said lateral gas-proof hinge 12. By pushing downward on the external end of said reset lever 13, the interior terminal end of said reset lever 13 presses upward in said reset slot 17 with sufficient force to return an actuated valve to the open flow, or operating configuration. Inadvertant triggering of the release mechanism by upward pressure on said reset lever 13 is not possible, as the only way said shaft 11 and stopper 16 can be released is by retraction of one or more said hooks 7 from said articulated head 8.

Figure 5:
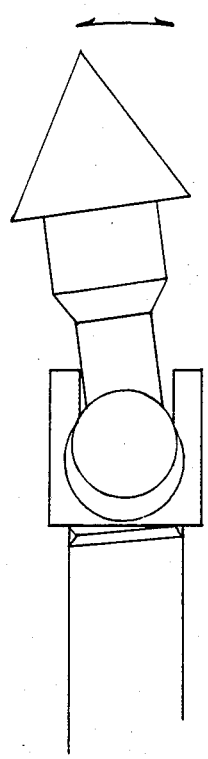
FIG. 5 shows the lateral range of motion of the conically shaped articulated head.

Once again refering to FIG. 1, actuation of the valve to the closed, or shut-off position is accomplished as follows: When a major earthquake occures and the lateral component of the earth's oscillations exceed a pre-determined frequency and magnitude (also known as intensity), one or more of said inertia weights 4 will tend to remain stationary as the valve housing 1 moves back and forth laterally, thereby causing said inertia weight(s) 4 to rotate inward, toward the suspension rod 3. Now refering to FIGS. 4A, 4B and 5; as any one of the three inertia weights 4 reach the suspension rod 3, its hook 7 will rotate outward a sufficient distance to disengage the lip of the conically shaped articulated head 8, allowing said head to be displaced laterally by the upward pressure of the two remaining hooks 7 working against the downward pressure of the spring 15, thereby disengaging the two remaining hooks 7 from said articulated head 8 and allowing said shaft 11 and stopper 16 to be driven downward against said valve seat 18. In like manner, if said valve housing 1 is tilted beyond a pre-determined angle in any direction from the vertical, one or more of said inertia weights 4 will tilt inward, thereby releasing said head 8, allowing said shaft 11 and stopper 16 to engage said valve seat 18 to shut off the flow of gas. A third, and equally important means in which the valve shuts off the flow of gas to an occupancy, is by the three aerodynamically designed flow vanes 5 and their reaction to an excess flow of gas, said flow vanes being an intregal part of each inertia weight 4. If a gas pipe is sheared off inside an occupancy, or at any point on the outlet side of the valve housing 1 to a gas distribution system, the escaping gas will exceed normal gas flow velocity, thereby pushing upward on the three flow vanes 5 and releasing said articulated head 8, said shaft 11 and said stopper 16, thereby closing said valve to further gas flow.

I claim:

1. A disaster mitigation gas shut-off valve for attachement to a gas line having a shut-off mechanism which is actuated by a vibratory shock, by an excess flow of gas, or by excess tilting of the valve comprising:

a. a hollow tube housing having a threaded gas inlet orifice incorporating a valve seat and a threaded gas outlet orifice;

b. a shaft and stopper which are spring biased to seat against said valve seat to effect closure when said shaft is released;

c. a conical-shaped articulated head attached atop said shaft by means of a ball and socket arrangement which serves as the retention point means for holding said shaft in the open position;

d. three circular discs spaced at intervals within said valve housing means for allignment and suspension of the moving parts of said valve and having gas vent holes to allow means for the said gas to travel through said circular discs;

e. a set of three wedge-shaped inertia weights with flow vanes, which are attached to a vertical suspension rod by means of three hinges at the lower end of said suspension rod and hinge points on said inertia weights; said weights being mass biased to tilt outward from said suspension rod, thereby causing each said weight's inward facing hook which is located below said hinge point, to engage the lip of said conical-shaped articulated head, holding said head and likewise said shaft and stopper upward against said spring pressure allowing gas to pass upward through said valve from said inlet orifice to said outlet orifice; and f. a reset lever which penetrates said valve housing through a gas tight hinge and inserts into said shaft means for allowing reset of said valve subsequent to activation without the need to disassemble any portion of said valve.

2. The gas valve of claim 1 wherein said inertia weights react to a vibratory force of pre-determined intensity means for tilting said weights inward toward said suspension rod means for retracting said hooks from said lip of said articulated head means for releasing said spring biased shaft and stopper, thereby shutting off the gas flow through said valve.

3. The gas valve of claim 1 having further an excess gas flow means for lifting the inertia weights to effect valve closure consisting of aerodynamically designed flow vanes which project horizontally from the sides of each said inertia weight just above said hinge point such that they partially obstruct the gas flow path during normal gas flow periods, but lift said inertia weights to activate said valve to close when said gas flows at a rate greater than a pre-determined normal velocity.

4. The gas valve of claim 1 having further means for activating the release mechanism wherein the tilting of said gas valve from the vertical beyond a pre-determined angle causes one or more of said inertia weights to fall by gravity means toward said suspension rod, thereby releasing said articulated head and said shaft and stopper means for shutting off the flow of gas.

5. The gas valve of claim 1 having a plurality of inertia weight and flow vane configurations thereby allowing customization of the valve to a wide range of gas shut-off applications.

6. The gas valve of claim 1 having further a reset lever means for lifting said shaft and stopper assembly to re-engage said articulated head by the three said hooks of said inertia weights; the reset lever penetrating said housing through a gas-tight seal and inserting into a reset slot in said shaft.

* * * * *